UNITED STATES PATENT OFFICE.

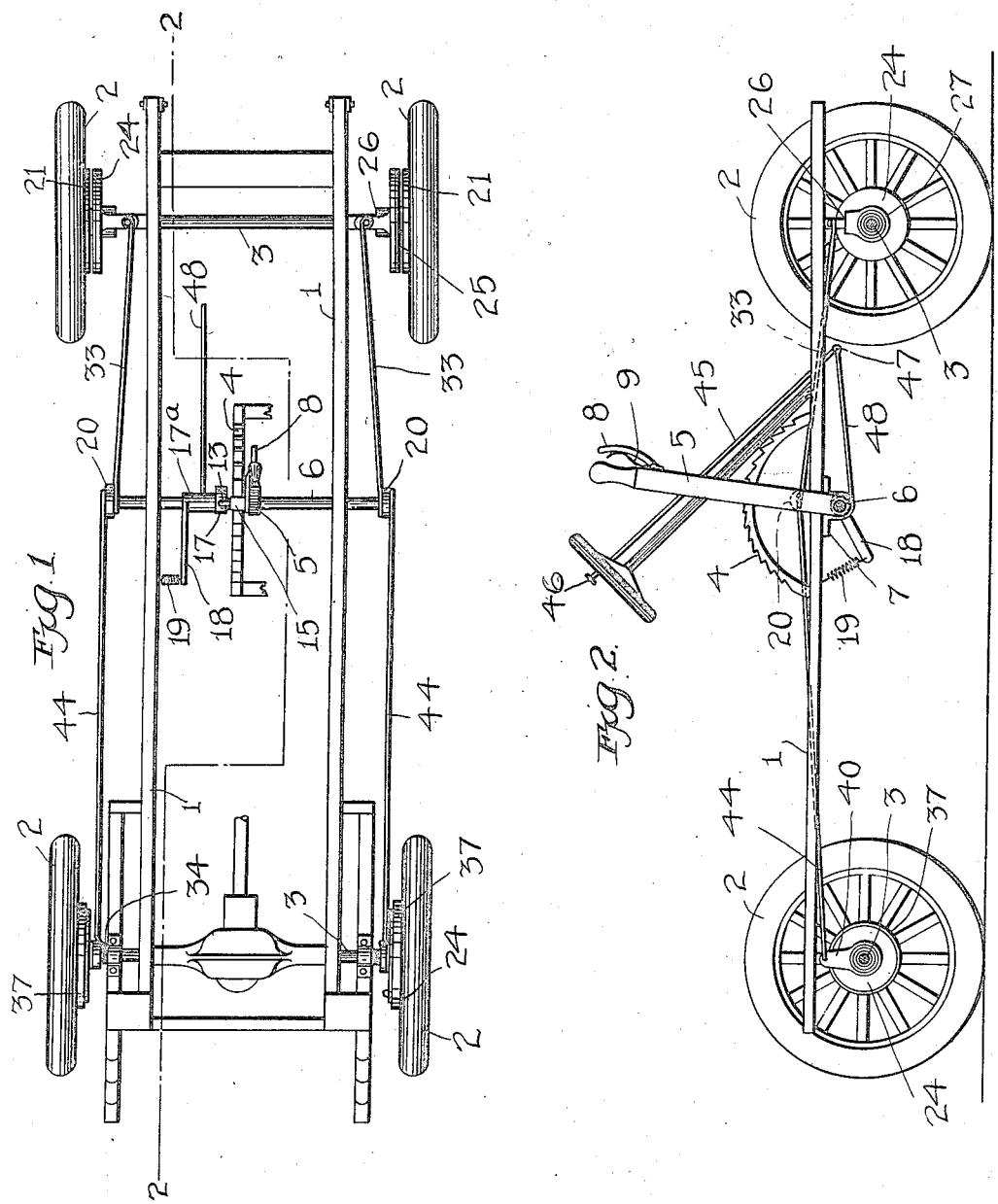

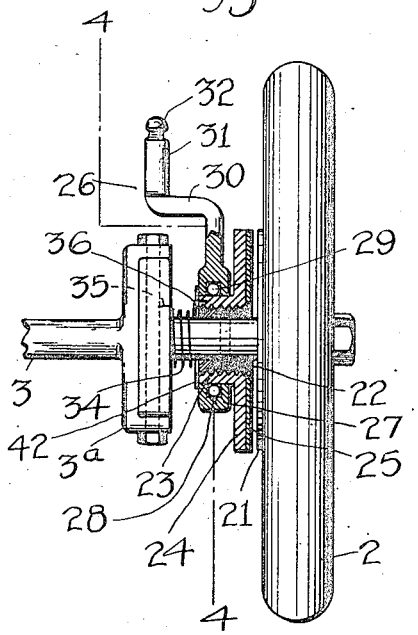
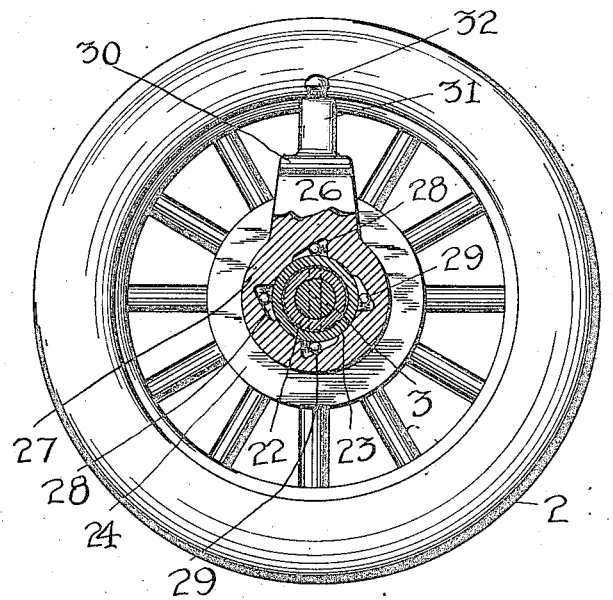
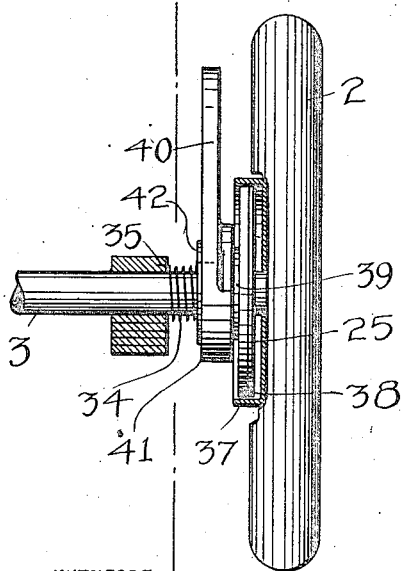
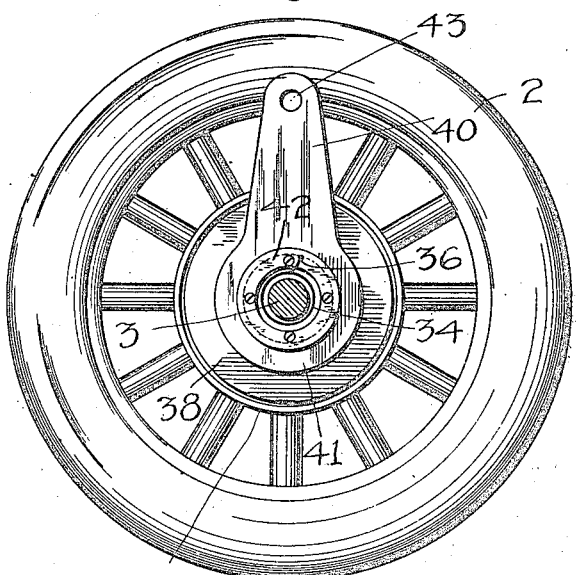

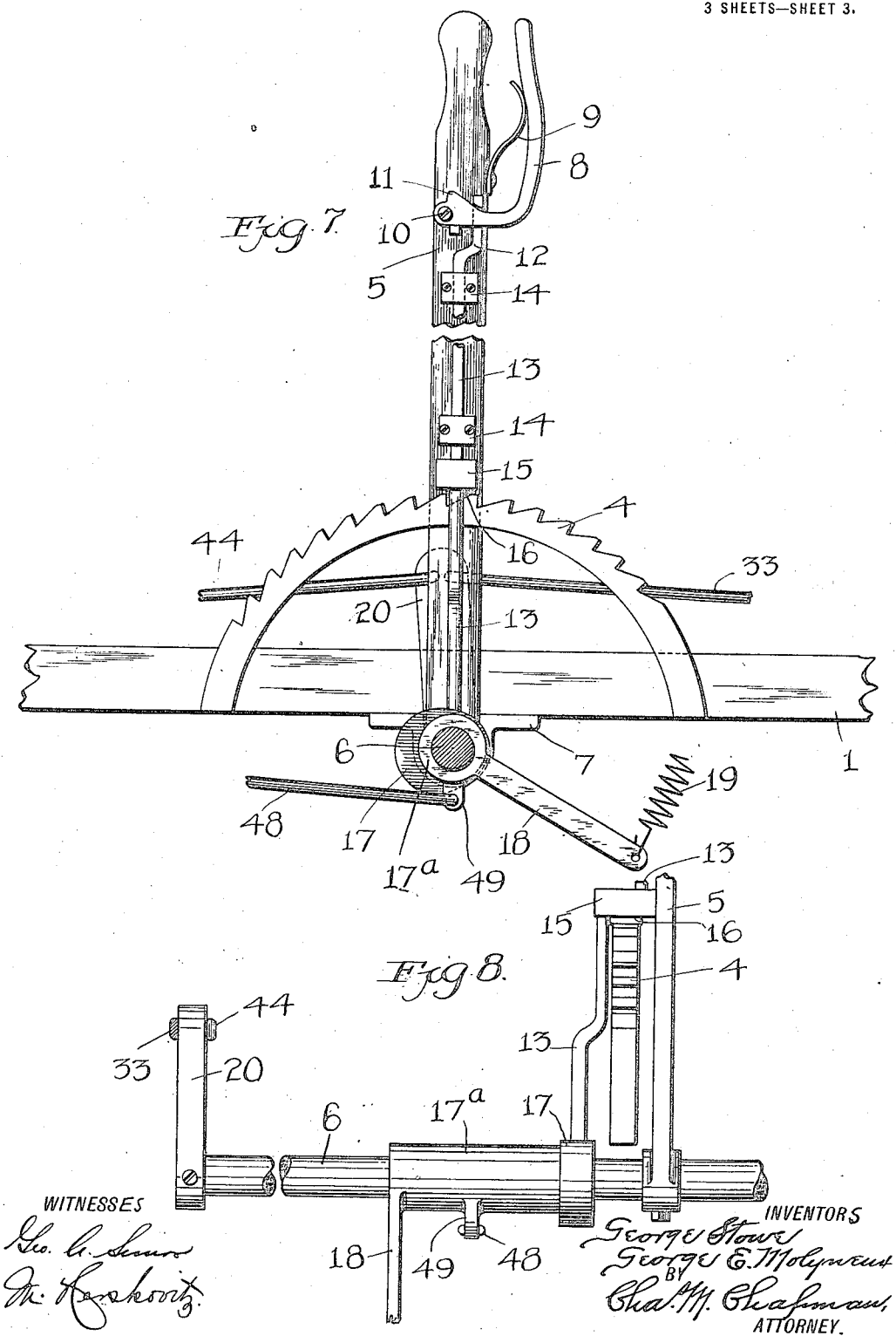

GEORGE STOWE, OF NEW YORK, N. Y., AND GEORGE E. MCLYNEUX, OF BAYONNE, NEW JERSEY.

BRAKE MECHANISM FOR AUTOMOBILES.

1,232,621. Specification of Letters Patent. Patented July 10, 1917.

Application filed January 13, 1916. Serial No. 71,817.

*To all whom it may concern:*

Be it known that we, GEORGE STOWE and GEORGE E. MOLYNEUX, both citizens of the United States, residing, respectively, in the borough of Manhattan, city, county, and State of New York, and Bayonne, county of Hudson, and State of New Jersey, have invented certain new and useful Improvements in Brake Mechanism for Automobiles, of which the following is a specification.

This invention relates to brakes for vehicles, and has particular reference to brakes which are semi-automatic and are applicable to automobiles and various other types of vehicles wherein the initial movement is given manually to the brake.

Among the objects of our invention may be noted the following: to provide a brake mechanism for vehicles wherein, when the brake parts are released, they will be automatically applied; to provide a brake mechanism for vehicles wherein, after the brake mechanism is once started into action the movement of the vehicle will drive the mechanism into braking action and increase said braking action in proportion to the speed of the vehicle; to provide a brake mechanism for automobiles capable of being applied to all four wheels of the vehicle simultaneously; to provide a brake mechanism for vehicles capable of locking the wheels simultaneously so as to bring the vehicle to a stop by traction and thus making it impossible for the vehicle to run over anyone after the brakes are applied; to provide a brake mechanism composed of a plurality of brake-members capable of being applied simultaneously and with equal power, so as to maintain the vehicle in its course and prevent any tendency thereof to turn or veer from its course; and to provide a brake mechanism capable of being set in action by either a manually operated lever, or through the medium of a push-rod or button.

With the above objects in view, and others which will be detailed during the course of this description, our invention consists in the parts, features, elements and combinations thereof hereinafter described and claimed.

In order that our invention may be clearly understood, we have provided drawings wherein:

Figure 1 is a top-plan view of the chassis of an automobile or similar vehicle with our brake mechanism applied thereto;

Fig. 2 is a longitudinal section on the line 2—2, Fig. 1;

Fig. 3 is a sectional elevation of a detail showing parts of the brake mechanism applied to one wheel;

Fig. 4 is a section substantially on the line 4—4 of Fig. 3;

Fig. 5 is a sectional elevation similar to Fig. 3 showing another form of our invention;

Fig. 6 is a view taken on the line 6—6 of Fig. 5;

Fig. 7 is an enlarged detail showing the controlling means and coöperating parts; and Fig. 8 is a front elevation of the parts shown in Fig. 7.

Referring to the drawings, the numeral 1 indicates the chassis of an automobile, for example, it being understood, however, that the illustration is simply suggestive of vehicles and is not to be taken as a limitation. The wheels of the vehicle are indicated by 2 and their shafts by 3. The brake segment or ratchet 4 may be of any usual type and may be applied in any suitable manner to the chassis or convenient portion of the frame of the vehicle. Coöperating with said segment is a lever 5, connected with the cross-shaft 6, journaled in brackets 7, secured to the chassis in suitable manner, the details of this mechanism being more particularly shown in Fig. 7, wherein the lever 5 is shown as provided with a latch-lever 8, normally pressed outwardly by a spring 9 and pivotally carried by the brake-lever at 10. The pivoted end of the latch-lever 8 is enlarged or formed into a cam 11, the surface of which coöperates with the upper end 12 of the latch-bar 13 to lift the latter by pressure upon the latch-lever, which will overcome the tension of spring 9. The cam form is given the end of lever 8 to facilitate the lifting of the latch-bar and the latter should be capable of being lifted quickly and positively. The latch-bar 13 is guided in lugs 14, secured to the brake-lever 5, and carries between its ends the detent 15, having a portion 16, which coöperates with the ratchet of the brake segment 4. The lower end of the latch-bar 13 is adapted to coöperate with the eccentric 17, so as to be also actuated thereby when desired, or according to the means employed for setting the brake in operation. The cam 17 is carried on one end of the sleeve 17ª, which turns on the shaft 6, Fig. 8, and the arm 18 is carried on the other end of said sleeve and is normally under control of the spring 19, one end of which is connected to the outer end of said arm, and the other end of which is connected to some fixed portion of the vehicle, such as the adjacent side bar of the chassis, Fig. 1. By this means, the sleeve is normally under tension and is held normally, as shown in Fig. 7, so that the executive part of the eccentric 17 is in the inoperative position shown in said figure, which permits the latch-bar 13 to normally rest at its lower limit with the detent member 16 in the brake segment 4. By this means, also, the arms 20, at opposite ends of the shaft 6, are normally held in a substantially upstanding position, which, as will presently be shown, holds the brake mechanism normally inactive.

Referring now to Figs. 1 to 4, the friction-imposing parts of the brake mechanism will be seen to consist of the fixed brake member 21, rigidly secured to the hub or any other suitable part of the wheel 2. The axle 3, adjacent the wheel, is provided with a fixed, screw-threaded collar 22, on which is set to operate the internally screw-threaded collar 23, provided with the flange or disk 24, having on its face a friction-pad 25, the latter being arranged to coöperate with the fixed friction-member 21. Surrounding the collar 23 is a lever 26, the enlarged disk-like portion 27 of which is grooved annularly to provide a plurality of angular recesses 28, spaced equi-distantly about the collar 23, and each having therein an anti-frictional ball 29, providing a ball-bearing clutch connection between said arm 26 and the collar 23. Each recess 28 contains a coiled spring which tends to hold the ball 29 in the small end of said recess. The upper end of the lever 26 is offset at 30, and has the portion 31 extending at a right-angle thereto and provided with a neck and head 32, the neck being adapted to receive a loop on the end of the rod 33, and the head being adapted to retain the connection thus made. The opposite end of the rod 33 is suitably connected to an arm 20, as clearly shown in Figs. 1 and 7. The brake-pad 25 is normally held released from the brake-member 21, as before noted, but with a normal tendency to approach the latter through the medium of the coiled spring 34, surrounding the axle 3 and connected at one end 35 to an adjacent relatively-fixed part of the axle-bearing or joint, said spring having its opposite end connected to the collar 23, as at 36. The tension of this spring normally tends to rotate the collar 23 upon the fixed collar 22, and set the brake and the quick screw-threaded connection between the two gives said collar and the brake-pad 25 a movement parallel to the axle 3, so as to cause the pad 25 to rapidly approach and engage the member 21, as will be readily understood.

This brake mechanism may be applied to all four wheels of the vehicle; but, in Figs. 1 and 2, we have shown this particular form of brake mechanism as applied only to the front or steering wheels of the vehicle, the same to be operated simultaneously upon release of the brake mechanism. We may, however, use the form of brake shown in Figs. 5 and 6, and as applied to the rear wheels of Fig. 1. In these figures, the wheels 2 are each provided with the cup-shaped or flanged brake-member or drum 37, with which coöperates the padded brake-member 38, carried by the collar 39, surrounding the axle 3 and coöperating with a screw-threaded collar, the same as 22, in the form of brake mechanism of Figs. 3 and 4. Springs 34 are employed in the same manner and for the same purpose as in Figs. 3 and 4. The lever 40 has its enlarged portion 41 surrounding the collar 39, and provided with the ball-bearing clutch construction illustrated in Fig. 4. In both forms of our invention a ring or washer 42 is secured to the collar 23, Fig. 3, and 39, Fig. 5, to prevent the ball-clutch from sliding off the collar. As shown in Fig. 6, the upper end of the lever 40 is provided with an aperture 43 for connection with one end of the rod 44, the other end of which is connected in any suitable manner, as shown in Fig. 7, to the arm 20. This mechanism is shown as applied to the rear wheels of the vehicle, but may also be applied to the front wheels; or, the mechanism of Figs. 5 and 6 can be applied to one pair of wheels, and the mechanism of Figs. 3 and 4 to the other pair of wheels. In applying the mechanism of Figs. 5 and 6 to the rear wheels of an automobile, the usual brake-drum can be utilized, our brake mechanism being substituted for the usual internal brake mechanism; and the regular service brake will be applied to the outside of said drum as usual.

Our brake, so far described, is an emergency brake and is to be substituted for and used in the same manner as the usual emergency brake now found on all types of motor-vehicles. It is applied to all four wheels and the members are applied simultaneously, quickly and with great power, as will be presently shown. The springs 34 are strong enough to respond to the requirements of quick action, so that, when the latch-bar is released, the brake-members automatically do their work.

It frequently happens that, when the emergency brake is required, it must be applied quickly, and to enable quick action to be obtained we have provided the handy mechanism shown in Figs. 1, 7 and 8. It consists of the push-rod 45, having the head 46 handy to the driver at the steering-wheel, said rod extending parallel with the shaft of the steering-wheel and being pivotally connected at its lower end 47 with the rod 48, connected to a lug 49, of the sleeve 17$^a$, which carries the eccentric 17 and arm 18. By pressing upon the head 46 of rod 45, and turning the sleeve 17$^a$, the tension of the spring 19 is overcome and the eccentric 17 will be turned upon the cross-shaft 6, so as to slide its highest part under the end of the latch-bar 13, thus lifting it and releasing the detent 16 from the brake segment 4. This done, the cross-shaft 6 will be rotated by the power of the springs 34, so as to cause the respective rods 33 and 44 to release the clutch mechanism, thus permitting the brake-members to be engaged.

Having thus described the details of our invention, the operation will be understood from the following: Manipulation of the brake-lever 5, as by pressing upon the latch-lever 8, will lift the latch-bar 13 so as to release the lever from the brake segment and enable the shaft 6 to be rotated, thus swinging the arms 20 and pushing the rods 44 and pulling the rods 33, resulting in causing the balls 29 of the clutch mechanisms to ride into the enlargements of the recesses 28, under the impulse given the collars 23 by the springs 34, so as to release the collars 23 and the brake-members 24, or the collars 39 and the brake-members 28 from said clutches. This results in permitting the springs 34 to rotate the said clutch-members relatively to the collars 22 and advance the padded brake-members into engagement with the fixed brake-members 21, in Fig. 3, and 37, in Fig. 5. Obviously, with the vehicle in action and the wheels 2 rotating, continued movement of the vehicle will force the brake-members together with a speed proportional to the speed of rotation of the wheels without any further effort on the part of the driver, who merely sets the brake mechanism in action by releasing one member thereof, and turning the lever 5 and shaft 6 to the left, viewing Fig. 2. The wheels 2 thus become locked and the speed of the vehicle is immediately checked, said wheels, according to the weight of the vehicle, creating great tractional friction. Pressure upon the head 46 of rod 45 will produce the same result by causing the cam 17 to lift the latch-bar 13, thus enabling the springs 34 to operate as described.

Movement of lever 5 to the right, Fig. 2, will cause the brakes to be released by reverse action of the clutch parts.

From the foregoing description, and with reference to the structure shown in Figs. 3 and 4, it will be seen that the upstanding portion 31 of the lever 26, to which the rod 33 is connected, is in alinement with the axis of the knuckle or joint 3$^a$, forming part of the usual front axle of the steering-wheels. This is necessary in order to maintain the connection of the operating mechanism with the clutch-members always in the same relation with reference to the pivot of the said knuckle or joint, regardless of the position of the wheels, or the exigencies of steering.

What we claim is:

1. A brake mechanism for vehicles having, in combination, a brake-couple; means normally tending to force the members of the couple together by a rotary movement imparted to one of them; and means for holding the members of the couple apart, including manually operated releasing means by which the holding means are thrown out of control.

2. A brake mechanism having, in combination, a pair of brake-members, one of which is adapted to rotate relatively to and with the other, and which is also adapted to reciprocate relatively to the other; means whereby said member may have rotary and reciprocatory movements; and means for normally preventing said movements.

3. Braking means for vehicles comprising a plurality of brake-couples, each including a means normally tending to force the couples together; means common to all the brake-couples for controlling the same; and means connecting said controlling means with said brake-couples whereby all of the latter may be set in operation simultaneously.

4. A brake mechanism for vehicles comprising a brake-couple, members of which are adapted to frictionally engage each other; means for causing said members to frictionally engage each other; and means for increasing the frictional engagement proportionally with the speed of the vehicle.

5. A brake mechanism comprising a brake-couple, members of which are adapted to frictionally engage each other; means normally tending to force one member into engagement with the other; and means for increasing the frictional engagement with a speed proportional to the speed of the vehicle.

6. A brake mechanism having, in combination, a pair of brake-members; means for driving one of the members into engagement with the other; means for controlling the action of the last-stated means so as to hold the said members apart; and a plurality of means for tripping the holding means whereby to permit the driving means to bring the brake-members into engagement.

7. A brake mechanism comprising a pair of brake-members; means for automatically driving one member into frictional engagement with the other; means for normally holding the automatic means from operation; and means for tripping the holding means so as to permit the automatic means to take control to set the brake.

8. The combination with a jointed axle and the wheel thereof, of a brake for said wheel comprising means for applying friction to said wheel; operating means for the frictional means; and means for normally holding the operating means from action, including a connection, the axis of which is in alinment with the axis of the joint of the axle.

GEORGE STOWE.
GEORGE E. MOLYNEUX.